(12) United States Patent
Take et al.

(10) Patent No.: US 7,792,041 B2
(45) Date of Patent: Sep. 7, 2010

(54) TRANSMISSION QUALITY MEASUREMENT APPARATUS, TRANSMISSION QUALITY MEASUREMENT METHOD, AND TRANSMISSION QUALITY MEASUREMENT SYSTEM

(75) Inventors: Yasuo Take, Kawasaki (JP); Kazuo Mizuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 11/964,005

(22) Filed: Dec. 24, 2007

(65) Prior Publication Data

US 2008/0159166 A1 Jul. 3, 2008

(30) Foreign Application Priority Data

Dec. 27, 2006 (JP) ............................. 2006-353266

(51) Int. Cl.
*H04L 12/26* (2006.01)
(52) U.S. Cl. ........................ 370/241; 370/252
(58) Field of Classification Search ....................... None
See application file for complete search history.

(56) References Cited

U.S. PATENT DOCUMENTS

| | | | |
|---|---|---|---|
| 2004/0071084 A1* | 4/2004 | El-Hennawey et al. | 370/230 |
| 2006/0190594 A1* | 8/2006 | Jorgenson et al. | 709/224 |
| 2007/0127389 A1* | 6/2007 | Klotz et al. | 370/252 |
| 2007/0223454 A1* | 9/2007 | Kimura et al. | 370/352 |

FOREIGN PATENT DOCUMENTS

JP 2006-268124 A 10/2006

\* cited by examiner

*Primary Examiner*—Min Jung
(74) *Attorney, Agent, or Firm*—Myers Wolin, LLC

(57) ABSTRACT

A transmission quality measurement method for measuring the transmission quality of data packets received via a network. The method includes storing reference data packets into a storage unit, receiving data packets produced by use of the reference data, identifying, based on the reference data, a data area in the received data packets corresponding to the reference data, and comparing data corresponding to the identified data area with the reference data and thereby measuring the transmission quality of the data.

11 Claims, 11 Drawing Sheets

TRANSMISSION QUALITY MEASUREMENT APPARATUS, TRANSMISSION QUALITY MEASUREMENT METHOD, AND TRANSMISSION QUALITY MEASUREMENT SYSTEM

BACKGROUND OF THE INVENTION

1. Background

The present invention relates to a transmission quality measurement apparatus which measures the transmission quality of data contained in data packets, for example audio data or video data, received via a network, a transmission quality measurement method which measures transmission quality, and a transmission quality measurement system in which data packets containing, for example, audio data or video data are transmitted from a first transmission quality measurement apparatus to a network, and a second transmission quality measurement apparatus measures the transmission quality of the data contained in the data packets, transmitted from the first transmission quality measurement apparatus, and received from the network.

2. Description of the Related Art

There have hitherto been techniques for monitoring and measuring the transmission quality of audio data or video data when the audio data or video data is packetized and transmitted via a network. For example, Japanese Patent Application Laid-Open No. 2006-268124 has disclosed a technique by which the receiving end of audio data packets or the like estimates the degradation of audio data or the like from the number of overflows or underflows in the reception buffer and thereby measures the transmission quality of audio data or the like sensed by the recipient.

Also, there has been a technique which transmits data packets simulating audio data packets or video data packets from one transmission quality measurement apparatus arranged in an IP (Internet Protocol) network to another transmission quality measurement apparatus. The technique measures the transmission quality of the audio data or video data from properties of packets received by the other transmission quality measurement apparatus.

For audio data, the transmission quality is calculated based on ITU-G.107 being ITU standard (ITU: International Telecommunication Union) or JJ-201.01 being TTC standard (TTC: Telecommunication Technology Committee); for video data, the transmission quality is calculated based on ITU-T.241 (ITU-R BT.1720).

However, according to the conventional art which measures transmission quality between transmission quality measurement apparatuses, transmission quality or packet loss cannot be measured when packets are routed through an analog network.

That is, as illustrated in FIG. 12, when data packets transmitted from one transmission quality measurement apparatus are relayed from an IP network through an analog network to an IP network, the data packets are converted into an analog signal in the analog network and then packetized again in the IP network and received by another transmission quality measurement apparatus. However, the received data packets are not necessarily identical to the data packets prior to going through the analog network; thus, according to the conventional art which compares transmitted data packets with received data packets on a packet by packet basis, the transmission quality of audio data or video data cannot be accurately measured.

Also, for data packets which are packetized again in the IP network after going through the analog network and received by the other transmission quality measurement apparatus, sequence numbers attached to each packet may be lost or the order of sequence numbers may be changed; thus, according to the conventional art which measures packet loss based on the sequence number, packet loss may not be detected.

There also arises a problem that, since the received data packets are not necessarily identical to the data packets prior to going through the analog network, it is not possible to measure fluctuations which represent enlarged interval between each audio data contained in the received packets or enlarged audio data component contained in the received packets.

In view of the above problems of the conventional art, the present invention advantageously provides a transmission quality measurement apparatus, transmission quality measurement method and transmission quality measurement system which can measure the transmission quality or packet loss of audio data or video data even when audio data or video data is relayed as data packets from an IP network through an analog network to an IP network.

SUMMARY

According to an aspect of an embodiment, a transmission quality measurement method for measuring the transmission quality of audio data or video data contained in data packets received via a network. The method includes storing reference data of audio data or video data to be contained in the data packets into a storage unit; receiving data packets produced by use of the reference data; identifying, based on the reference data, a data area corresponding to the reference data from among audio data or video data received in the data packets; and comparing audio data or video data corresponding to the identified data area with the reference data, thereby measuring the transmission quality of the audio data or video data.

DETAILED DESCRIPTION OF THE EMBODIMENTS

Embodiments of a transmission quality measurement apparatus, transmission quality measurement method and transmission quality measurement system according to the present invention will be described in detail with reference to the accompanying drawings.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

First, an example of the inventive transmission quality measurement apparatus will be described as Embodiment 1, and then other embodiments included in the present invention will be described.

Figure 1:
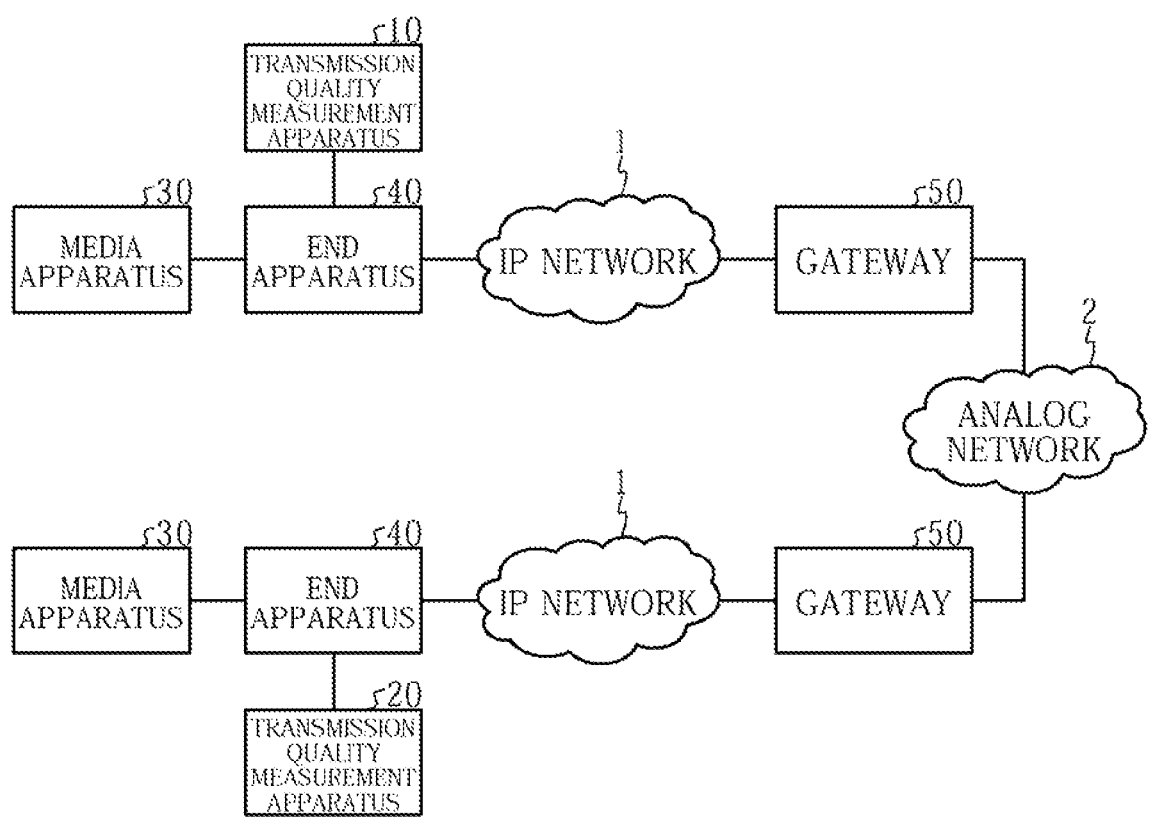
FIG. 1 is a view illustrating a transmission quality measurement system in which a transmission quality measurement apparatus according to Embodiment 1 is used.
Figure 2:
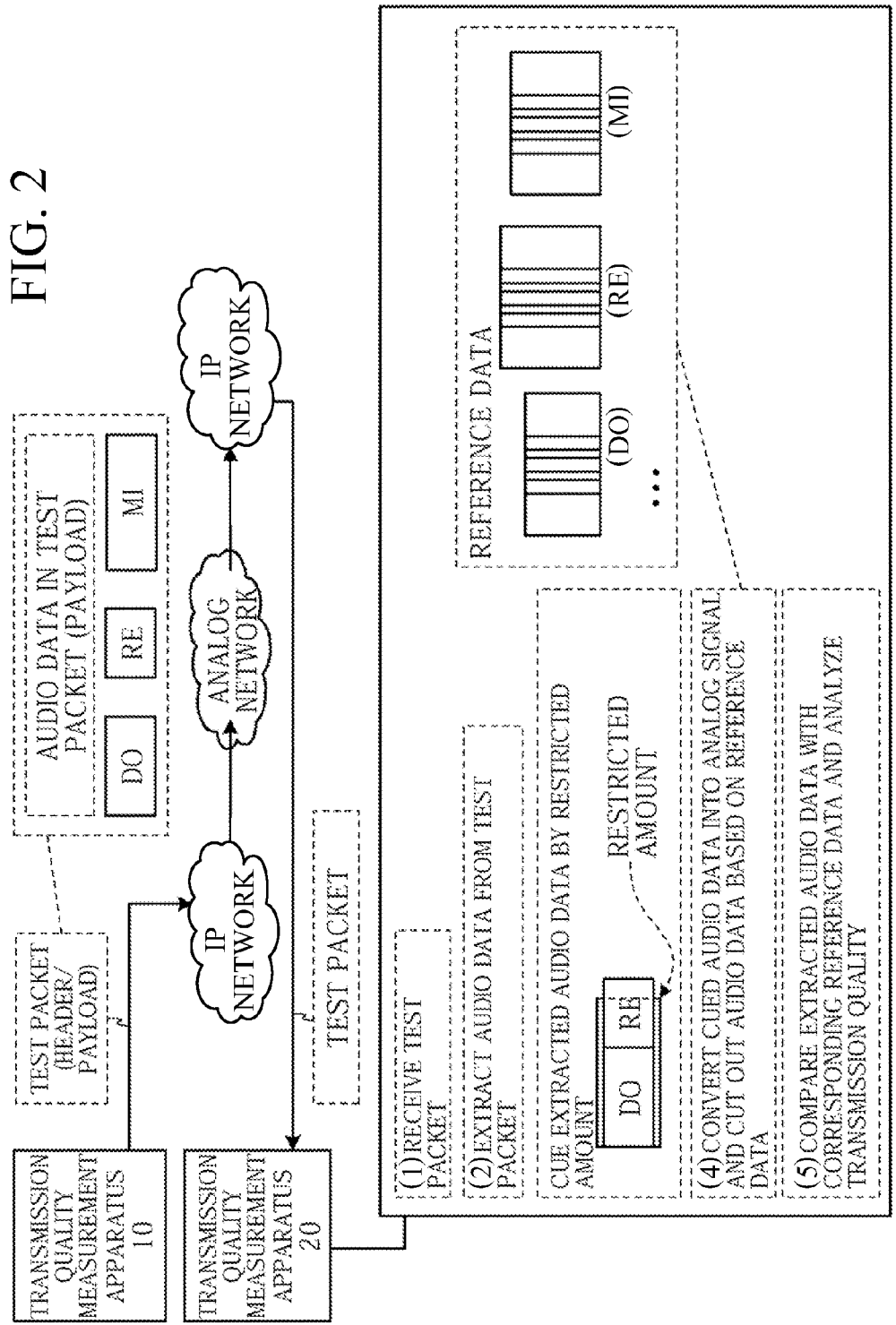
FIG. 2 is a view for explaining an outline and features of the transmission quality measurement apparatus according to Embodiment 1.
Figure 3:
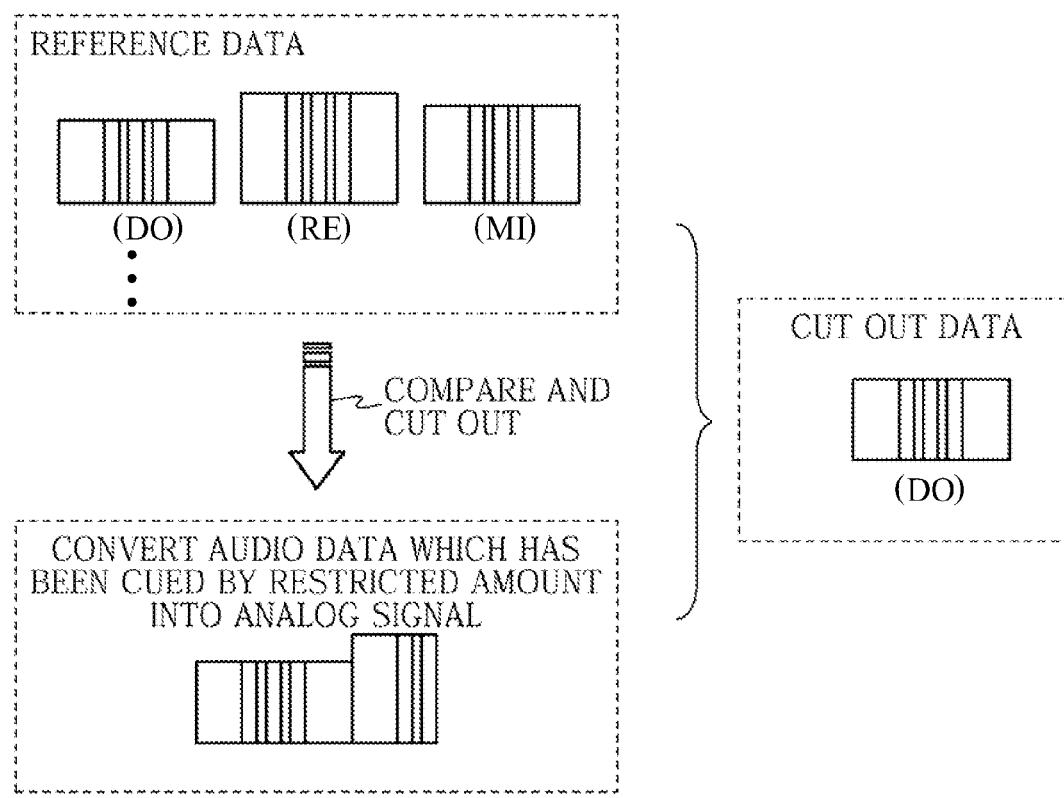
FIG. 3 is a view illustrating an example of cutting out audio data.

An outline and features of the transmission quality measurement apparatus according to Embodiment 1 will be described with reference to FIGS. 1 to 3. FIG. 1 is a view illustrating a transmission quality measurement system in which a transmission quality measurement apparatus according to Embodiment 1 is used; FIG. 2 is a view for explaining an outline and features of the transmission quality measurement apparatus according to Embodiment 1; FIG. 3 is a view illustrating an example of cutting out audio data.

The transmission quality measurement apparatus according to Embodiment 1 is used for measuring the transmission quality of audio data or video data contained in data packets received via a network. A feature of the apparatus is that the transmission quality of audio data or video data can be measured even when audio data or video data is relayed as data packets from an IP network through an analog network to an IP network.

A transmission quality measurement system as illustrated in FIG. 1 includes, for example, a pair of transmission quality measurement apparatuses 10 and 20, a media apparatus 30 and an end apparatus 40, whereby data packets can be transmitted/received via an IP network 1, an analog network 2 and a gateway 50.

The media apparatus 30 is used for transmitting or receiving data packets containing data, for example audio data or video data. The end apparatus 40 serves to mediate between the media apparatus 30 and the IP network, and has the function of, for example, ADSL modem, ADSL router or the equivalent thereof. The gateway 50 is arranged between the IP network 1 and the analog network 2, and has a function of, for example, a codec for performing digital-analog conversion or analog-digital conversion.

The transmission quality measurement apparatuses 10 and 20 according to Embodiment 1 constitute a pair of transmitting and receiving ends, for example, and transmit or receive test packets simulating data packets transmitted from the media apparatus 30 and thereby measuring the transmission quality of data contained in the test packets. The data simulating for example audio data or video data from the media apparatus 30.

More specifically, as illustrated in FIG. 2, the transmission quality measurement apparatus 10 transmits a test packet composed of a header and payload to the transmission quality measurement apparatus 20. Stored in the test packet header are "payload type" "sequence number" "synchronization transmitting end identifier" and the like; stored in the payload are audio data (for example, signal data of "do" "re" and "mi") produced based on preliminarily stored reference data.

Upon reception of test packets from the transmission quality measurement apparatus 10 (refer to (1) in FIG. 2), the transmission quality measurement apparatus 20 extracts audio data from the payload of the test packet (refer to (2) in FIG. 2) and at the same time cues the extracted audio data by a preliminarily set predetermined restricted amount (refer to (3) in FIG. 2).

And the amount of cued audio data is monitored, and when the predetermined restricted amount of cued audio data is reached, the transmission quality measurement apparatus 20 converts the cued audio data into an analog signal and cuts out based on preliminarily stored reference data (for example, signal data), a part thereof corresponding to the reference data (refer to (4) in FIG. 2). More specifically, as illustrated in FIG. 3, the preliminarily stored respective reference data are compared to the audio data which has been cued by the predetermined restricted amount and converted into an analog signal, and a part thereof (for example, signal data of "do") which equals the reference data or satisfies a predetermined degree of equality is cut out.

Here, the degree of equality is determined using known techniques for determining the degree of equality, such as pattern matching or template matching.

After the cutting out of audio data, the transmission quality measurement apparatus 20 compares the cut out audio data with the reference data corresponding to the audio data, and measures transmission quality based on ITU-G.

107 being ITU standard (ITU: International Telecommunication Union) or JJ-201.01 being TTC standard (TTC: Telecommunication Technology Committee) (refer to (5) in FIG. 2).

In this way, even when audio data or video data is relayed as data packets from an IP network through an analog network to an IP network, the transmission quality measurement apparatus according to Embodiment 1 can measure the transmission quality of audio data or video data.

Configuration of Transmission Quality Measurement Apparatus

Figure 4:
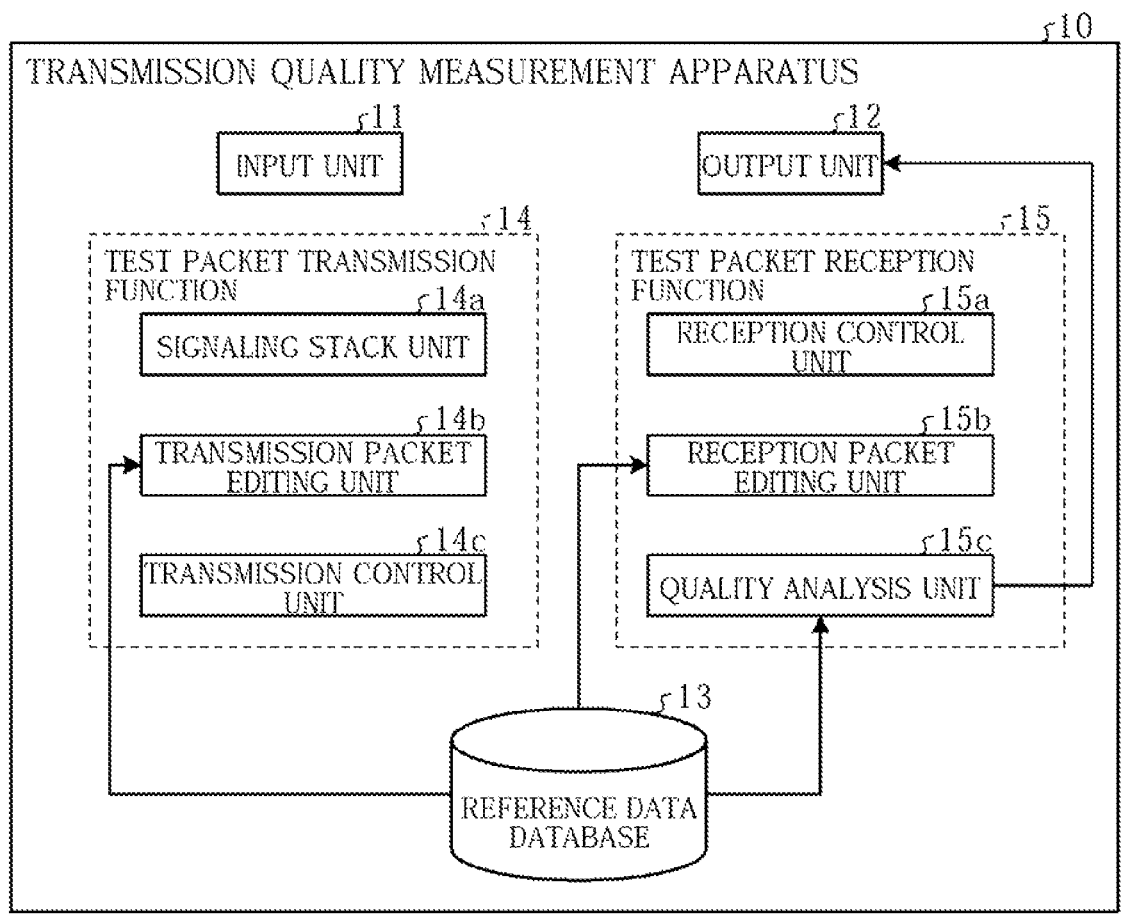
FIG. 4 is a block diagram illustrating a configuration of the transmission quality measurement apparatus according to Embodiment 1.

FIG. 4 is a block diagram illustrating the configuration of the transmission quality measurement apparatus 10 according to Embodiment 1. The above described transmission quality measurement apparatuses 10 and 20 have similar functions, and hence the configuration of the transmission quality measurement apparatus 10 will be described below.

The transmission quality measurement apparatus 10 includes, as illustrated in FIG. 4, an input unit 11, output unit 12, reference data database 13, test packet transmission function 14 and test packet reception function 15.

The input unit 11 is an input receiving unit which receives various types of information, and includes a key operation part; for example, a transmission quality test start command and the like are inputted by the user.

The output unit 12 is a unit which outputs various types of information, and includes a monitor (or a display unit, touch panel) and loudspeaker; for example, the measurement result of transmission quality is outputted.

The reference data database 13 is a storage unit which stores data and the like needed for various types of processing by the test packet transmission function 14 and test packet reception function 15 and more specifically, stores reference data (for example, audio signal data of "do" "re" "mi" and the like) used for the production of a test packet or the measurement of transmission quality.

The test packet transmission function 14 is a processor which includes an internal memory for storing a prescribed control program, a program which defines various types of processing procedures, and required data, and executes various types of processing by use of these programs and data.

The test packet transmission function 14 includes, as units closely related to the present invention, a signaling stack unit 14a, a transmission packet editing unit 14b and a transmission control unit 14c.

The signaling stack unit 14a is a processor which performs signal processing of a test packet to a receiving end apparatus; for example, a processing based on a communication control protocol such as SIP (Session Initiation Protocol) is performed.

Figure 5:
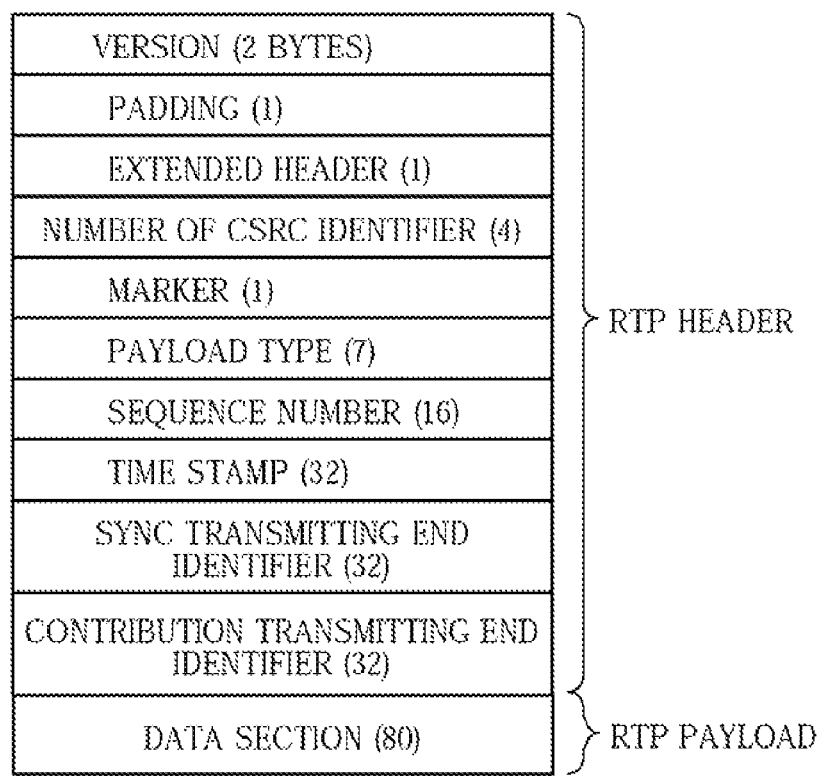
FIG. 5 is a view illustrating an exemplary configuration of test packet.

The transmission packet editing unit 14b is a processor which produces a test packet by use of the reference data stored in the reference data database 13; more specifically, the unit 14b produces a test packet composed of, as illustrated in FIG. 5, a header (RTP header) and payload (RTP payload) produced by use of a transmission protocol such as RTP (Realtime Transport Protocol) used to perform streaming reproduction of audio data or video data. Stored in the payload is the reference data stored in the reference data database 13.

The transmission control unit 14c is a processor which controls the transmission of a test packet produced by the transmission packet editing unit 14b to the receiving end apparatus.

The test packet reception function 15 is a processor which includes an internal memory for storing a prescribed control program, a program which defines various types of processing procedures, and required data, and executes various types of processing by use of these programs and data.

The test packet reception function 15 includes, as units closely related to the present invention, a reception control unit 15a, a reception packet editing unit 15b and a quality analysis unit 15c.

The reception control unit 15a is a processor which controls the reception of a test packet transmitted from the transmitting end apparatus.

The reception packet editing unit 15b is a processor which performs an editing processing of a test packet received by the reception control unit. More specifically, the unit 15b extracts audio data from the payload of a test packet and at the same time cues the extracted audio data by a preliminarily set predetermined restricted amount to store it into an internal buffer or the like. And the amount of cued audio data is monitored, and when the predetermined restricted amount of cued audio data is reached, the unit 15b converts the cued audio data into an analog signal and cuts out, based on reference data (for example, signal data) preliminarily stored in the reference data database 13, a part thereof corresponding to the reference data.

The cutting out of cued audio data will be described in detail. As illustrated in FIG. 3, the preliminarily stored respective reference data are compared to the audio data which has been cued by the predetermined restricted amount and converted into an analog signal, and a part thereof (for example, signal data of "do") which equals the reference data or satisfies a predetermined degree of equality is cut out. Here, the degree of equality is determined using known techniques for determining the degree of equality, such as pattern matching or template matching.

Figure 6:
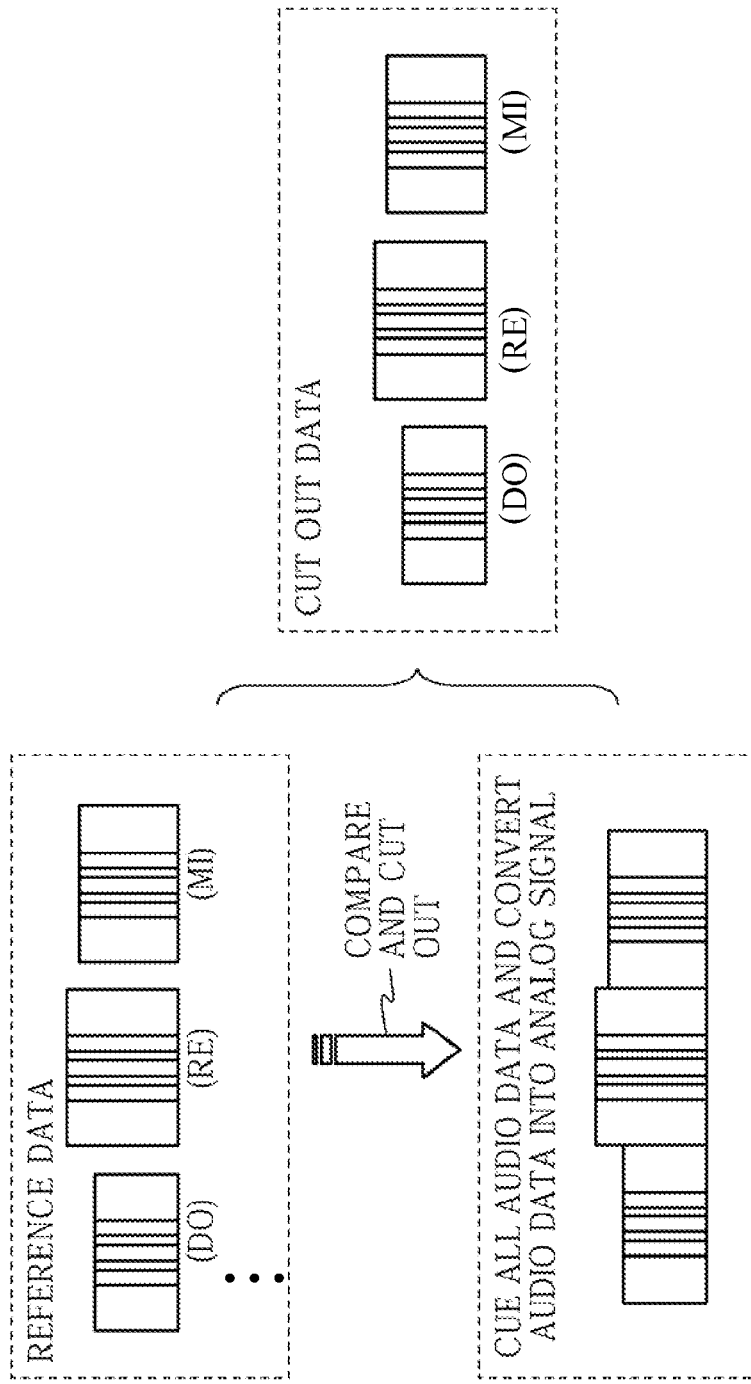
FIG. 6 is a view illustrating an example of cutting out audio data.

Here, the audio data does not always need to be cued by a preliminarily set predetermined restricted amount from the payload of a test packet and then cut out, but as illustrated in FIG. 6, for example, all the audio data may be cued from the payload of a test packet and then a part (for example, signal data of "do" "re" and "mi") thereof corresponding to the reference data may be cut out.

The quality analysis unit 15c is a processor which measures the transmission quality of the test packet processed by the reception packet editing unit 15b, and more specifically, compares the audio data cut out by the reception packet editing unit 15b with the reference data corresponding to the audio data and thereby measures transmission quality based on ITU-G.107 being ITU standard (ITU: International Telecommunication Union) or JJ-201.01 being TTC standard (TTC: Telecommunication Technology Committee).

Transmission Quality Measurement Procedure

Figure 7:
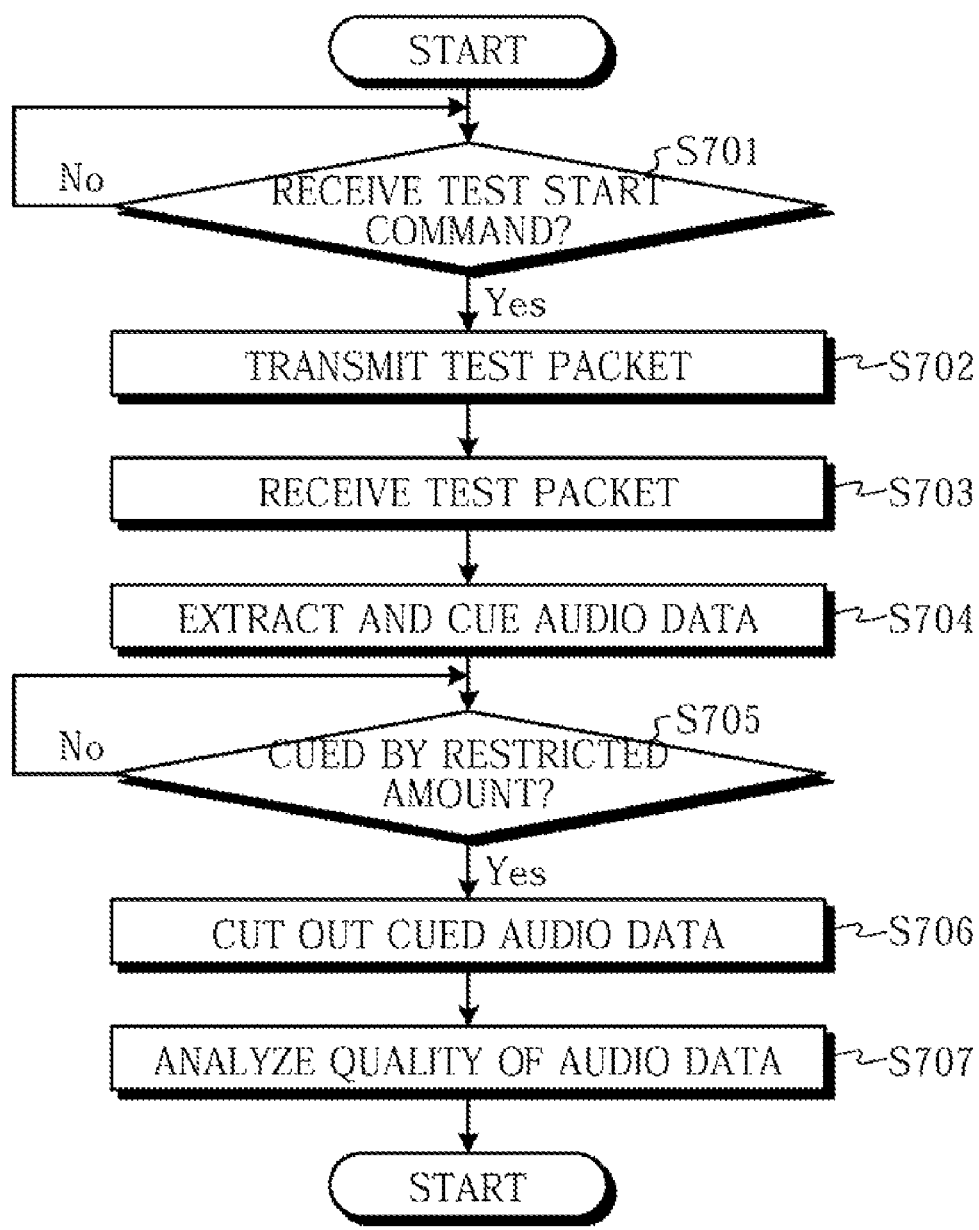
FIG. 7 is a flowchart illustrating a transmission quality measurement procedure according to Embodiment 1.

FIG. 7 is a flowchart illustrating a transmission quality measurement procedure according to Embodiment 1. Described below is the measurement procedure when the transmission quality measurement apparatus 10 is used as the test packet transmitting end apparatus and the transmission quality measurement apparatus 20 as the test packet receiving end apparatus.

When the input unit 11 illustrated in FIG. 4 receives a transmission quality test start command and the like from the user (YES in step S701), the transmission quality measurement apparatus 10 performs a signaling processing of a test packet to the receiving end apparatus and produces a test packet by use of the reference data stored in the reference data database 13 and transmits the produced test packet to the transmission quality measurement apparatus 20 (step S702).

Upon reception of the test packet (step S703), the transmission quality measurement apparatus 20 extracts audio data from the payload of the test packet and cues the extracted audio data by a preliminarily set predetermined restricted amount and stores the cued audio data into an internal buffer or the like (step S704).

Then, the transmission quality measurement apparatus 20 monitors the amount of cued audio data (step S705), and when the predetermined restricted amount of cued audio data is reached (YES in step S705), converts the cued audio data into an analog signal, and cuts out, based on reference data (for example, signal data) preliminarily stored in the reference data database 13, a part thereof corresponding to the reference data (step S706).

The cutting out of cued audio data will be described in detail. As illustrated in FIG. 3, the preliminarily stored respective reference data are compared to the audio data which has been cued by the predetermined restricted amount and converted into an analog signal, and a part thereof (for example, signal data of "do") which equals the reference data or satisfies a predetermined degree of equality is cut out. Here, the degree of equality is determined using known techniques for determining the degree of equality, such as pattern matching or template matching.

The transmission quality measurement apparatus 20 compares the cut out audio data with the reference data corresponding to the audio data and thereby measures transmission quality based on ITU-G.107 being ITU standard (ITU: International Telecommunication Union) or JJ-201.01 being TTC standard (TTC: Telecommunication Technology Committee) (step S707).

As described above, according to Embodiment 1, the reference data of audio data received as a test packet is preliminarily stored; when a test packet produced by use of the reference data is received, and audio data stored in the test packet is cued, and a part thereof corresponding to the reference data is cut out from the cued audio data, and the cut out audio data and the stored reference data are compared to measure the transmission quality of audio data. Accordingly, even when audio data or video data is relayed as data packets from an IP network through an analog network to an IP network, the transmission quality of audio data or video data can be measured.

Embodiment 2

The above-described embodiment is merely exemplary of the present invention, and many modifications to the embodiment described above are possible within the scope of the invention. Thus, another embodiment included in the technical scope of the invention will be described below.

(1) Detection of Packet Loss

Figure 8:
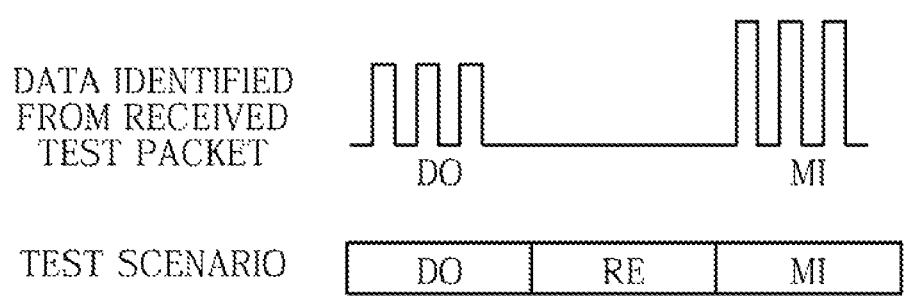
FIG. 8 is a view illustrating an example of packet loss.

In Embodiment 1 described above, a packet loss of received test packets may be detected. For example, as illustrated in FIG. 8, a test scenario (for example, information indicating that audio data "do, re, mi" are transmitted in that order) being information on transmission order indicating the transmission order of test packets containing audio data, is preliminarily stored in a receiving end transmission quality measurement apparatus, whereby packet loss representing the lost part of data packet is detected based on the audio data (for example, "do" and "mi") corresponding to a data area identified based on the reference data and the stored test scenario.

In this way, even when audio data or video data is relayed as data packets from an IP network through an analog network to an IP network, packet loss can be detected.

(2) Detection of Fluctuations

In Embodiment 1 described above, fluctuations in audio data contained in received test packets may be detected. Here, "fluctuations" refer to an enlarged interval between each audio data contained in the received packets or to an enlarged audio data component contained in the received packets.

Figure 9:
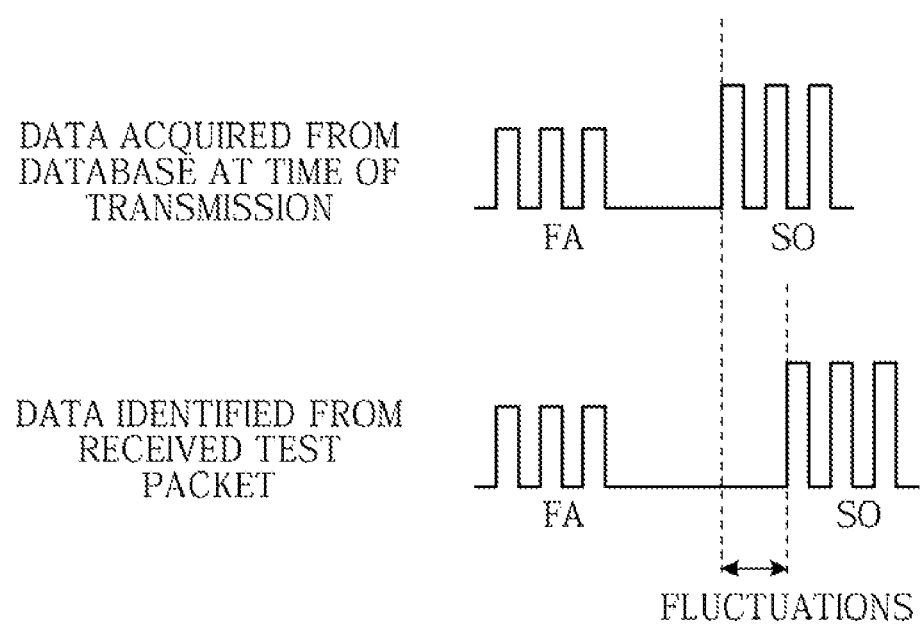
FIG. 9 is a view illustrating an example of enlarged interval between identified audio data components.

More specifically, as illustrated in FIG. 9, a difference is detected between the audio data (for example, "fa" and "so") identified from the received test packets and the audio data ("fa" and "so" identical to the reference data stored in the reference data database 13) contained in the test packets at the time of transmission corresponding to audio data identified from the cued and cut out audio data, whereby fluctuations representing an enlarged interval between each audio data contained in the received packets are detected.

Figure 10:
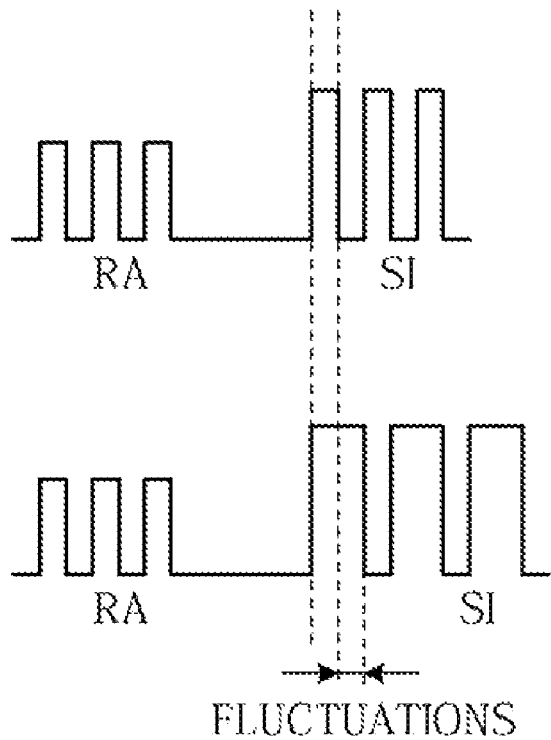
FIG. 10 is a view illustrating an example of enlarged identified audio data component.

Similarly, as illustrated in FIG. 10, a difference is detected between the audio data (for example, "ra" and "si") identified from the received test packets and the audio data ("ra" and "si" identical to the reference data stored in the reference data database 13) contained in the test packets at the time of transmission corresponding to audio data identified from the cued and cut out audio data, whereby fluctuations representing an enlarged audio data component contained in the received packets are detected.

In this way, even when audio data or video data is relayed as data packets from an IP network through an analog network to an IP network, fluctuations representing an enlarged interval between each audio data contained in the received packets or enlarged audio data component contained in the received packets can be detected.

(3) Apparatus Configuration and the Like

Each constituent component of the transmission quality measurement apparatus 10 illustrated in FIG. 4 is merely conceptual and does not necessarily need to be constructed as a physical unit as illustrated in FIG. 4. More specifically, the configuration of the transmission quality measurement apparatus 10 is not limited to the one illustrated in FIG. 4, and various distributed or integrated configurations of the transmission quality measurement apparatus 10 are possible; for example, the test packet transmission function 14 and test packet reception function 15 may be distributed, or all or part of the apparatus may be functionally or physically distributed or integrated as any unit according to load or usage state. Further, all or part of each processing function (the test packet transmission function and the test packet reception function, refer to FIG. 7) performed by the transmission quality measurement apparatus 10 may be implemented by a CPU and program to be analyzed and executed by the CPU, or may be implemented by hardware of wired logic.

(4) Transmission Quality Measurement Processing Program

Figure 11:
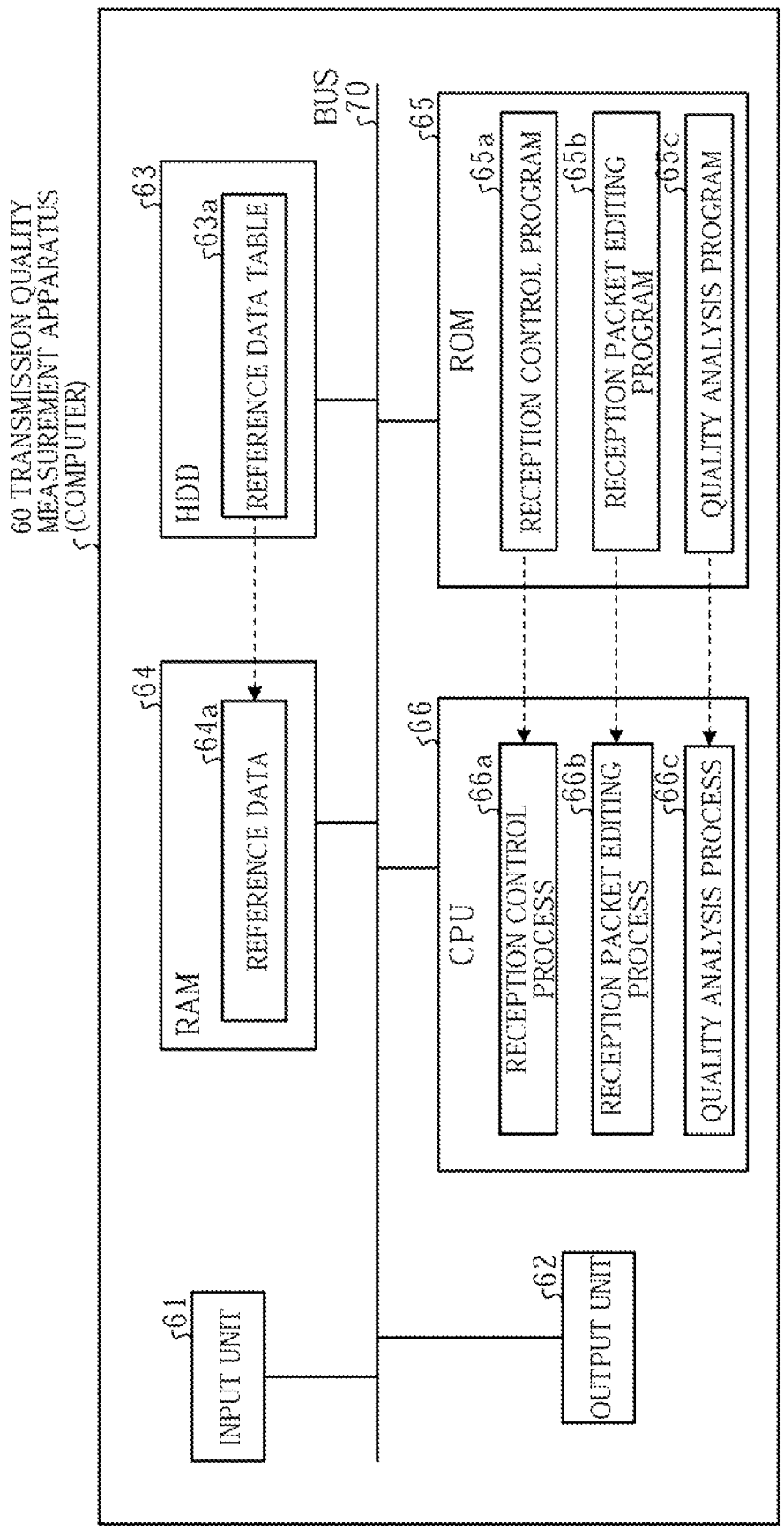
FIG. 11 is a view illustrating a computer which executes a transmission quality measurement processing program.
Figure 12:
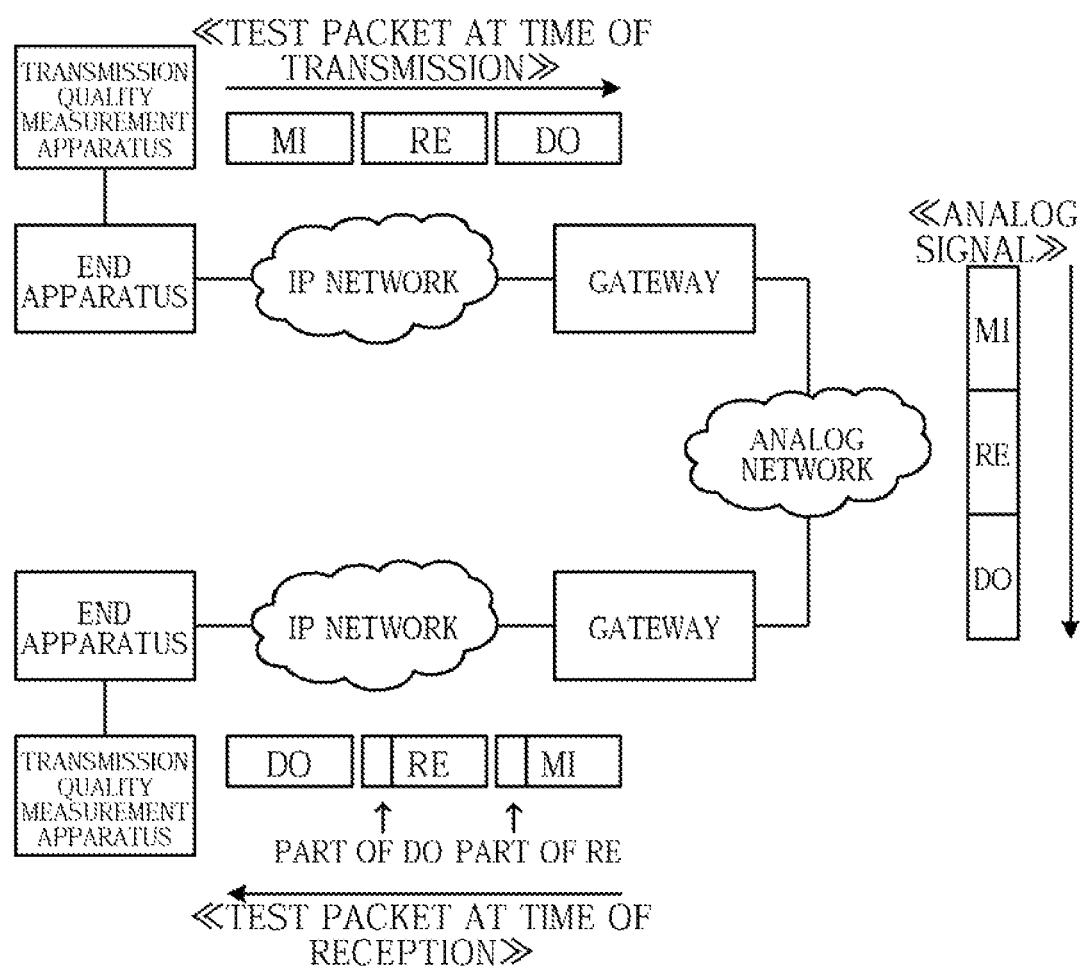
FIG. 12 is a view for explaining a problem of conventional art.

Various types of processing (for example, refer to FIG. 7 and the like) of the transmission quality measurement apparatus 10 described above in Embodiment 1 can be implemented by causing a computer system such as personal computer or workstation to execute a prepared program. Thus, there will be described below with reference to FIG. 11 an exemplary computer which executes a transmission quality measurement processing program having a similar function as the test packet reception function 15 of the transmission quality measurement apparatus 10 described in Embodiment 1. FIG. 11 is a view illustrating the computer which executes the transmission quality measurement processing program.

As illustrated in FIG. 11, a computer 60 is constituted of an input unit 61, output unit 62, HDD 63, RAM 64, ROM 65 and CPU 66; these are connected via a bus 70. The input unit 61 and output unit 62 correspond to the input unit 11 and output unit 12 of the transmission quality measurement apparatus 10 illustrated in FIG. 4, respectively.

Preliminarily stored in the ROM 65 is a transmission quality measurement processing program which has a function similar to that of the test packet reception function 15 of the transmission quality measurement apparatus 10 illustrated above in Embodiment 1; that is, the program is, as illustrated in FIG. 11, composed of a reception control program 65a, reception packet editing program 65b and quality analysis program 65c. These programs 65a, 65b and 65c may be appropriately integrated or distributed, similarly to each constituent component of the transmission quality measurement apparatus 10 illustrated in FIG. 4. Here, the ROM 65 may be a nonvolatile "RAM".

The CPU 66 reads these programs 65a, 65b and 65c from the ROM 65, whereby the programs 65a, 65b and 65c function as a reception control process 66a, reception packet editing process 66b and quality analysis process 66c, respectively as illustrated in FIG. 11. The processes 66a, 66b and 66c correspond to the reception control unit 15a, a reception packet editing unit 15b and a quality analysis unit 15c of the test packet reception function 15 of the transmission quality measurement apparatus 10 illustrated in FIG. 4, respectively.

Stored in the HDD 63 is, as illustrated in FIG. 11, a reference data table 63a. The reference data table 63a corresponds to the reference data database 13 illustrated in FIG. 2. The CPU 66 reads the reference data 64a from the reference data table 63a, stores it into the RAM 64, and executes a transmission quality measurement processing based on the reference data 64a stored in the RAM 64.

The programs 65a, 65b and 65c may not necessarily be preliminarily stored in the ROM 65; for example, they may be stored in a "portable physical medium" inserted in the computer 60 such as a flexible disk (FD), CD-ROM, DVD disk, magneto-optical disk or IC card, or in a "stationary physical medium" such as HDD arranged in the inside or outside of the computer 60, or in "another computer (or server)" connected via the public line, the Internet, LAN or WAN to the computer 60. In this case, the computer 60 reads each program from these media and executes it.

The transmission quality measurement apparatus, transmission quality measurement method and transmission quality measurement system according to the present invention are useful in measuring the transmission quality of RTP data, for example audio data or video data, contained in data packets received via a network. Particularly, even when audio data or video data is relayed as data packets from an IP network through an analog network to an IP network, the transmission quality or packet loss of audio data or video data can be measured.

What is claimed is:

1. A transmission quality measurement apparatus comprising:
   a packet reception unit to receive test packets and extract data from a payload of the test packets;
   a storage unit to store the extracted data included in a plurality of the test packets;
   an identifying unit to identify, based on reference data stored in the storage unit, a portion of the extracted data corresponding to the reference data from among the extracted data stored in the storage unit; and
   a transmission quality measurement unit to compare the identified data portion with the reference data and detect a lost part among the plurality of the test packets.

2. The transmission quality measurement apparatus according to claim 1, wherein the extracted data includes at least one of audio data and video data.

3. The transmission quality measurement apparatus according to claim 2, further comprising:
   a transmission order information storage unit to store transmission order information indicating the transmission order of data packets containing respective audio data or respective video data; and
   a lost part detection unit for detecting the lost part of the test packets based on audio data or video data corresponding to the data portion identified by the data identifying unit and the transmission order information stored by the transmission order information storage unit.

4. The transmission quality measurement apparatus according to claim 2, further comprising a detection unit to detect a difference between audio data corresponding to the data portion identified by the identifying unit and the reference data stored by the storage unit.

5. A transmission quality measurement method comprising:
   receiving test packets and extracting data from a payload of the test packets;
   storing the extracted data included in a plurality of the test packets;
   identifying, based on reference data, a portion of the extracted data corresponding to the reference data from among the stored extracted data; and
   comparing the identified data portion with the reference data to detect a lost part among the plurality of the test packets.

6. The method of claim 5, wherein the extracted data includes at least one of audio data and video data.

7. The method of claim 5, wherein said comparing produces a measure of transmission quality of the extracted data.

8. The transmission quality measurement method according to claim 5, further comprising:
   storing transmission order information indicating the transmission order of data packets containing the extracted data including respective audio data or respective video data; and
   detecting the lost part of the data packets based on audio data or video data corresponding to the identified data portion and the stored transmission order information.

9. The transmission quality measurement method according to claim 5, further comprising detecting a difference between the extracted data, including audio data, corresponding to the identified data portion and the reference data.

10. A transmission quality measurement program embodied in a non-transitory computer readable medium which causes a computer to execute a method comprising:
    extracting data from a payload of test packets;
    storing the extracted data included in a plurality of the test packets;
    identifying based on reference data, a portion of the extracted data corresponding to the reference data from among the stored extracted data; and
    comparing the identified data portion with the reference data to detect a lost part among the plurality of the test packets, wherein the test packets are produced by use of the reference data.

11. The transmission quality measurement program embodied in a computer readable medium of claim 10, wherein said comparing produces a measure of transmission quality of the extracted data.

* * * * *